United States Patent [19]

Yamamoto et al.

[11] Patent Number: 5,567,303
[45] Date of Patent: Oct. 22, 1996

[54] HYDROGEN STORING MEMBER AND PROCESS FOR STORING HYDROGEN INTO THE HYDROGEN STORING MEMBER

[75] Inventors: Keisuke Yamamoto, Atsugi; Toshiyuki Komatsu, Hiratsuka, both of Japan

[73] Assignee: Canon Kabushiki Kaisha, Tokyo, Japan

[21] Appl. No.: 345,714

[22] Filed: Nov. 22, 1994

Related U.S. Application Data

[62] Division of Ser. No. 34,648, Mar. 22, 1993, Pat. No. 5,391,366, which is a continuation of Ser. No. 562,904, Aug. 6, 1990, abandoned.

[30] Foreign Application Priority Data

Aug. 4, 1989 [JP] Japan ..................................... 1-203036

[51] Int. Cl.⁶ ..................................................... G25B 1/02
[52] U.S. Cl. .......................... 205/637; 205/639; 205/704
[58] Field of Search ............................. 423/658.2, 647.7; 206/0.7; 204/241, 278, 129; 205/704, 637, 639

[56] References Cited

U.S. PATENT DOCUMENTS

| | | | |
|---|---|---|---|
| 4,200,623 | 4/1980 | Muller et al. | 423/644 |
| 4,283,226 | 8/1981 | van Mal et al. | 423/644 |
| 4,360,505 | 11/1982 | Sheridan, III et al. | 423/658.2 |
| 4,389,239 | 6/1983 | Klatt et al. | 423/658.2 |
| 4,389,326 | 6/1983 | Tanguy et al. | 423/645 |
| 4,402,933 | 9/1983 | de Pous | 423/658.2 |
| 4,431,561 | 2/1984 | Ovshinsky et al. | 206/0.7 |
| 4,489,049 | 12/1984 | Forester et al. | 423/658.2 |
| 4,609,038 | 9/1986 | Ishikawa et al. | 206/0.7 |
| 4,661,415 | 4/1987 | Ebato et al. | 423/658.2 |
| 4,920,753 | 5/1990 | Sasaki et al. | |
| 5,158,759 | 10/1992 | Marinescu | 206/0.7 |

FOREIGN PATENT DOCUMENTS

| | | | |
|---|---|---|---|
| 71801 | 5/1982 | Japan | 423/658.2 |
| 1147010 | 4/1969 | United Kingdom | 423/658.2 |

OTHER PUBLICATIONS

"Observation of Nuclear Fusion in Condensed Matter", Nature, vol. 338, pp. 737–740, Apr. 1989.

Primary Examiner—Wayne Langel
Attorney, Agent, or Firm—Fitzpatrick, Cella, Harper & Scinto

[57] ABSTRACT

A hydrogen storing member which comprises at least two kinds of hydrogen storing materials comprising a first hydrogen storing material and a second hydrogen storing material capable of releasing or storing hydrogen in a range of at least one of temperature and pressure at which the first hydrogen storing material is in the β phase having a high capacity for storing hydrogen.

3 Claims, 3 Drawing Sheets

HYDROGEN STORING MEMBER AND PROCESS FOR STORING HYDROGEN INTO THE HYDROGEN STORING MEMBER

This application is a division of application Ser. No. 08/034,648 filed Mar. 22, 1993, now allowed, U.S. Pat. No. 5,391,366 which in turn, is a continuation of application Ser. No. 07/562,904, filed Aug. 6, 1990, now abandoned.

BACKGROUND OF THE INVENTION

1. Field of the Invention

This invention relates to a hydrogen storing member capable of storing hydrogen and a process for storing hydrogen into the hydrogen storing member, and particularly to a hydrogen storing member capable of storing hydrogen at a high concentration without scaling-up of an apparatus for storing hydrogen and a process for storing hydrogen into the hydrogen storing member. Thus, the present invention relates to a hydrogen storing member widely applicable to an apparatus for hydrogen purification and recovery, a heat pump, an apparatus for storing hydrogen, an actuator, an apparatus for cold nuclear fusion, etc. and a process for storing hydrogen into the hydrogen storing member.

2. Related Background Art

Recently, hydrogen has been attracting attention as an energy source in place of the fossil fuel. The attractive points of hydrogen are particularly that water is a raw material and thus hydrogen as a resource has no limit; hydrogen causes no environmental pollution; hydrogen has a wide field of applications; hydrogen can serve as a means for storing other energy; and hydrogen can be used for energy transportation. Now, the transportation and storage of hydrogen are carried out in the form of a compressed hydrogen gas or liquefied hydrogen, which is not always regarded as an efficient process for transporting or storing hydrogen from the viewpoints of safety, transportation-storage efficiency and economy.

Recently, hydrogen storing materials are attracting attentions as a process for storing hydrogen, because hydrogen can be stored at a density equal to or higher than that of liquefied hydrogen.

As the process for storing hydrogen into a hydrogen storing member composed of a hydrogen storing alloy (metal), the following two main processes have been so far available. The first process is to bring about a vessel containing a hydrogen storing member into a hydrogen (light hydrogen) gas atmosphere compressed to a few to a few tens of atmospheres and utilize a solid solution equilibrium of a metal hydride composed of two elements, i.e. a metal and hydrogen under a high pressure, thereby conducting hydrogen storage. The second process is to use a hydrogen storing alloy as a cathode and storing hydrogen (light hydrogen) generated at the cathode by electric current passage into the hydrogen storing alloy as an application of water electrolysis.

Usually, the hydrogen content in the hydrogen storing material according to the first process depends upon the hydrogen gas pressure in the vessel and the temperature of the hydrogen storing alloy, and the hydrogen content abruptly increases with higher pressure of the hydrogen gas or lower temperature of the hydrogen storing material. When a metal or an alloy is used as a hydrogen storing material in this manner, hydrogen storage is carried out by utilizing the phenomenon that the structure of the hydrogen storing material depends upon the temperature or the pressure and thus the quantity of stored hydrogen is also changed thereby.

In the second electrolysis process, the pressure on the cathode surface depends upon the applied voltage at the electrolysis and thus the pressure on the cathode surface can be increased from a few atmospheres to a few tens of atmospheres by increasing the voltage.

On the other hand, very recently, nuclear fusion using a hydrogen storing member has been reported and the usefulness of the hydrogen storing member in the nuclear fusion has been pointed. That is, in the so far proposed nuclear fusion processes, a high temperature plasma of deuterium is maintained by the action of magnetic field, or compressed to a high density, and the nuclear fusion reaction is carried out before the scattering of the plasma. Thus, in order to maintain the high temperature plasma in a confined state for a long time, a very large apparatus based on the Tokamak system has been used. On the other hand, it has been recently reported that cold nuclear fusion can be generated according to a simple process for electrolysing a heavy water solution containing many kinds of metal ions, using a hydrogen storing member composed of a simple metal such as Pd, Ti, etc. as a cathode. The cold nuclear fusion is carried out by combining deuterium in a hydride of Pd or Ti by electrolysis, using a simple metal of Pd or Ti capable of deuterium as a cathode. For example, S. E. Jones et al reported in Nature 338 (1989) 737 "observation of cold nuclear fusion in condensed matter" that neutrons generated during the electrolysis were measured by a high sensitive detector and neutrons of 2.5 MeV were detected thereby, and proved that the nuclear fusion reaction took place to a very slight degree. Thus, the hydrogen storing member and a process for storing hydrogen are attracting attentions in the nuclear fusion.

However, the process requiring a high pressure or a low temperature in storing hydrogen into the hydrogen storing member has such problems as scale-up of the apparatus for carrying out the process, an increase in the operating cost and a difficulty to control the atmosphere in which the hydrogen storing member is placed (control of pressure, etc.).

On the other hand, particularly in case of applying the hydrogen storing member to the nuclear fusion, thereby occasioning the nuclear fusion reaction efficiently, deuterium must be stored in excess in the hydrogen storing member. In the conventional process it was impossible to store the deuterium in much excess in the hydrogen storing member. For this reason, the probability of nuclear fusion reaction was low and the absolute amount of detected neutrons was very small.

SUMMARY OF THE INVENTION

An object of the present invention is to solve the above-mentioned problems and provide a hydrogen storing member capable of efficiently storing hydrogen at a high concentration and a process for storing hydrogen in the hydrogen storing member.

Another object of the present invention is to provide a hydrogen storing member capable of efficiently storing hydrogen at a high concentration without scale-up of an apparatus for storing hydrogen into the hydrogen storing member or an increase in the operating cost or without the difficulty to control the atmosphere in which the hydrogen storing member is placed, and also to provide a process for storing hydrogen in the hydrogen storing member.

DETAILED DESCRIPTION OF THE PREFERRED EMBODIMENTS

The present invention utilizes the phenomena that the hydrogen storing capacity of a hydrogen storing material is greatly changed by such external factors as temperature, pressure, etc. and the temperature and pressure at which the change takes place depend upon the species of the hydrogen materials. That is, when for example, two kinds of hydrogen storing materials are used, hydrogen is stored into the first hydrogen storing material and the second hydrogen storing material at such a low temperature that these two hydrogen storing materials can store much hydrogen, and then hydrogen is released from the second hydrogen storing material at such a high temperature that hydrogen is released only from the second hydrogen storing material, thereby forcely making the released hydrogen intrude into the adjacent first hydrogen storing material. That is, hydrogen can be efficiently stored in excess into the first hydrogen storing material.

More detailed explanation of the hydrogen storing function will be made below, referring the case of using two different kinds of the first and second hydrogen storing materials. The term "hydrogen" herein used means light hydrogen, deuterium, tritium or their mixture, unless otherwise specifically mentioned.

Figure 2:
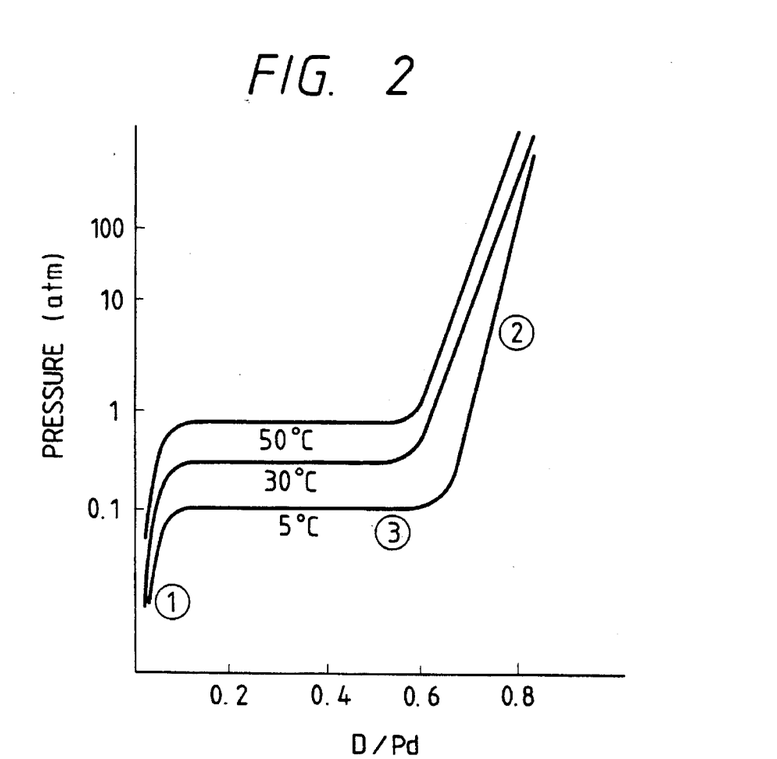
FIGS. 2 and 3 are diagrams showing isotherms between the pressure and the composition in systems of hydrogen storing member and deuterium.

FIG. 2 is a diagram showing isothermal curves of pressure-composition of Pd–D system as one example of hydrogen storing material-deuterium (D).

In FIG. 2 the region shown by ① is a region of single $\alpha$ phase having a small hydrogen storing capacity, the region shown by ② is a region of single $\beta$ phase having a large hydrogen storing capacity and the region shown by ③ is a two-phase coexisting region of $\alpha+\beta$ phases. For example, under a deuterium pressure 1 to 10 atm and at a temperature of 5° to 50° C., Pd metal is a simple metal of $\beta$ phase.

Figure 3:
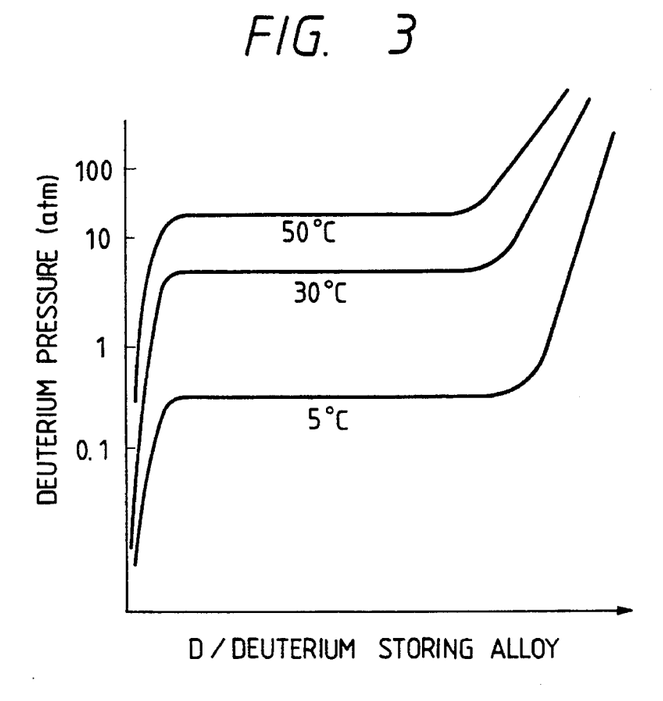

FIG. 3 is a diagram showing isothermal curves of pressure-composition of alloy as deuterium storing materials suitable for the present invention. Under a deuterium pressure of 1 atm, the deuterium storing alloy is in the $\beta$ phase at 5° C., and in the $\alpha$ phase 30° C. or higher. That is the deuterium is stored in the $\beta$ phase deuterium storing alloy at 5° C. and then the $\beta$ phase is shifted to the $\alpha$ phase by elevating the temperature to 30° C. or higher to release the stored deuterium from the deuterium storing alloy.

That is, in this embodiment a hydrogen storing member is constituted from a first deuterium storing material and a second deuterium storing material (alloy) capable of phase shifting between the $\alpha$ phase and the $\beta$ phase ($\alpha \leftarrow\!\!\!\rightarrow \beta$) within temperature and pressure range in which the first deuterium storing material is kept in the $\beta$ phase, and heavy water is supplied to the hydrogen storing member from the outside. By subjecting the hydrogen storing member to an appropriate temperature cycle, storing or release of deuterium in or from the second hydrogen storing material is carried out and pumping of deuterium into the first deuterium storing material provided on the inner side is carried out to increase the hydrogen concentration in the first deuterium storing material.

In the foregoing embodiment, two kinds of hydrogen storing materials having different transition points for hydrogen storage and release are used, but it is needless to say that a combination of more than two kinds of hydrogen storing materials can be used, so long as they have different transition points for hydrogen storage and release.

Furthermore, in the foregoing embodiment the transition (phase shifting) for hydrogen storage and release is occasioned by changing the temperature, but as is evident from FIGS. 2 and 3, the transition can be occasioned by changing the pressure or by changing both temperature and pressure. The transition by changing the temperature or the pressure can be occasioned not only once, but also repeatedly, for example, several times.

Any combination of materials can be used in the present invention for the hydrogen storing member, so long as the materials have the above-mentioned characteristics. The hydrogen storing materials for use in the present invention include, for example, simple metals such as Pd, Ca, Mg, Ti, Zr, V, Nb, Fe, etc. and alloys containing at least one of these simple metals. The hydrogen storing alloys for use in the present invention include, for example, Pd-based alloys, Mg-based alloys such as $Mg_2Cu$, $Mg_2Ni$, etc., Ti-based alloys such as TiFe, TiCo, TiMn, $TiCr_2$, etc., and Zr-based alloys such as $ZrMn_2$, etc. Rare earth element-based alloys containing at least one of rare earth elements represented by La or Mm (misch metal), etc. can be used, and also La-Ni-based alloys such as $LaNi_5$, etc., Mm-Ni-based alloys such as CaMmNiAl, etc. can be used. Among these hydrogen-storing metals and alloys, it is particularly desirable to form the hydrogen storing member from combinations of Pd/$LaNi_5$, Pd/FeTi, Ti/$LaNi_5$, etc.

The structure of the hydrogen storing member can be such a layer structure that one hydrogen storing material encloses another hydrogen storing material. The layer structure must be a structure of a plurality layer, which can be constituted by different kinds of hydrogen storing materials or can be constituted by repetitions of several kinds of hydrogen storing material layers.

Furthermore, the hydrogen storing member can be in such a structure that particles of one hydrogen storing material are distributed in a matrix formed from another hydrogen storing material. When it is taken into consideration that all the hydrogen released from the second hydrogen storing material is absorbed into the first storing material, thereby storing the hydrogen in the first hydrogen storing material at a high density, it is desirable that the hydrogen storing member is in such a structure that the second hydrogen storing material may not be exposed to the surrounding atmosphere to the utmost or at all. In order to increase the probability of occasioning cold nuclear fusion, it is desirable that the first hydrogen storing material is in an expanded state to some extent and thus the first hydrogen storing material as a bulky matrix is covered with the second hydrogen storing material, which is further covered with the first hydrogen storing material. However, the hydrogen storing member is not always constituted by the hydrogen storing material in a bulky state, that is, parts or the entirety of the hydrogen storing member may be constituted by a powdery hydrogen storing material.

The shape of the hydrogen storing member is not limited to a sheet form, a plate form, a spherical form, a rod form, etc. and any shape can be taken, so long as the shape can ensure efficient hydrogen storing or can be readily applied as an electrode.

The present invention will be explained in detail below, referring to the drawings.

EXAMPLE 1

In this Example, a rod-shaped hydrogen storing member in a three-layer structure comprising a pair of first hydrogen storing materials and a second hydrogen storing material being provided between the first hydrogen storing materials was used to occlude deuterium therein by electrolysis.

Figure 1:
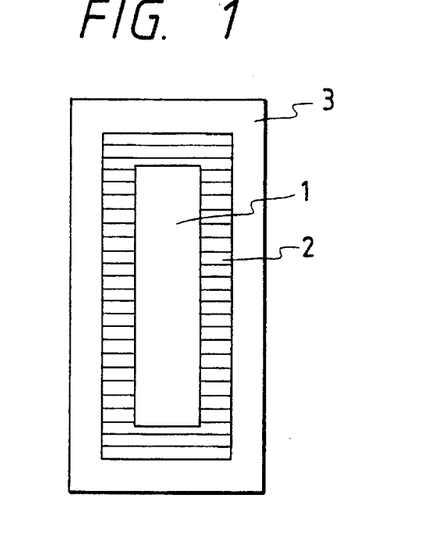
FIG. 1 is a schematic cross-sectional view showing one structure of a hydrogen storing member according to the present invention.

FIG. 1 is a schematic cross-sectional view showing one embodiment of a rod-like, hydrogen (deuterium) storing member according to the present invention, where numeral 1 is a metal as a first hydrogen storing material, such as Pd, etc. and 2 is a second hydrogen storing material covering the first hydrogen storing material 1, and a hydrogen storing alloy, etc. capable of shifting into the $\alpha$ phase with a temperature range where the first hydrogen storing material 1 is in the $\beta$ phase can be used as the second hydrogen storing material. Numeral 3 is the first hydrogen storing material further covering the second hydrogen storing material.

EXAMPLE 1—1

The hydrogen storing member shown in FIG. 1 was prepared in the following manner.

On a rod-like matrix of Pd (4 mm in diameter and 40 mm long) corresponding to numeral 1 in FIG. 1 was formed a thin film of $LaNi_5$ (thickness: about 10 μm) as a deuterium storing alloy corresponding to numeral 2 in FIG. 1 by plasma melt injection. Then, Pd was vapor deposited thereon in vacuum by resistance heating to form a portion (thickness: 1 μm) corresponding to numeral 3 in FIG. 3, thereby obtaining a hydrogen storing member for storing deuterium.

Figure 4:
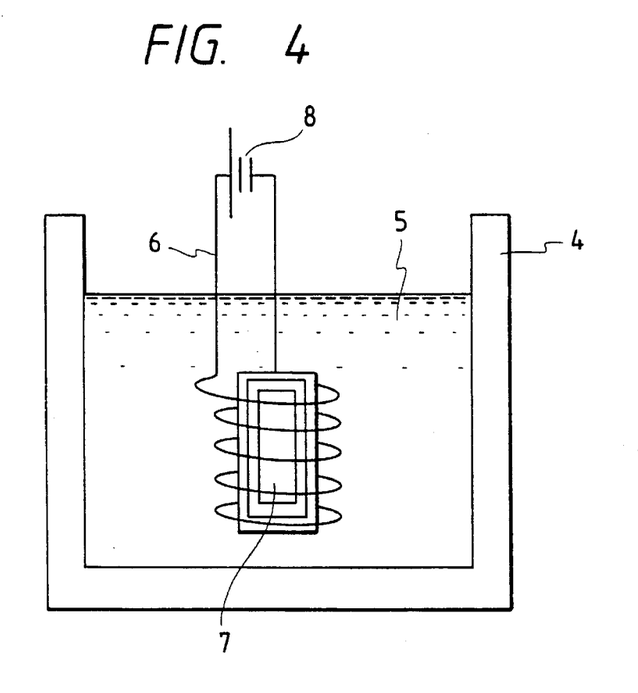
FIG. 4 is a schematic view showing an apparatus for storing hydrogen in a solution, applicable to the present invention.

The thus prepared hydrogen storing member was placed in an apparatus shown in FIG. 4, where numeral 4 is a temperature-controllable thermostat tank, 5 is a heavy water solution containing 0.1 mol/dm$^2$ of LiOD, 6 is a platinum wire anode, 0.5 mm in diameter, 7 is the hydrogen storing member as a cathode, 8 is a power source.

Heavy water was electrolyzed at an applied voltage of 5 V in the apparatus by repeating one electrolysis step at an electrolytic solution temperature of 5° C. for about 30 minutes and another electrolysis step at an electrolytic solution temperature of 30° C. for about 20 minutes for total duration of about 10 days. The solution temperature was controlled by controlling the temperature of the thermostat tank 4 through a control means (not shown in the drawing).

In this process, Pd corresponding to the first hydrogen storing materials 1 and 3 and $LaNi_5$ corresponding to the second hydrogen storing material 2 occluded deuterium at an electrolytic solution temperature of 5° C., and then at an elevated temperature of 30° C., Pd of the members 1 and 3 was kept in the $\beta$ phase, whereas $LaNi_5$ of the member 2 was shifted into the $\alpha$ phase. That is, the deuterium was released from the $LaNi_5$ layer, and the deuterium released at a high density could be confined into the Pd layers at a high concentration.

In order to occasion cold nuclear fusion reaction, deuterium must be confined at a high density so that the atomic nuclei themselves can frequently collide one another. According to the above-mentioned S. E. Jones et al report, it could be confirmed that the nuclear fusion reaction took place by the measurement of neutrons and $\gamma$-rays.

In this example, a liquid scintilator was provided around the apparatus to measure the $\gamma$-rays by a scintilation counter during the electrolysis on the 10th day, and it was found that 3-fold emission of $\gamma$-rays was detected against the background.

COMPARATIVE EXAMPLE 1—1

When simple Pd was used as the cathode in the same process as in Example 1—1, only emission of $\gamma$-rays substantially on the same level as that of the background was detected.

EXAMPLE 1-2

On a Pd rod corresponding to the member 1 in FIG. 1 was formed FeTi as the second hydrogen storing material corresponding to the member 2 by plasma melt injection, and then Pd3 was vapor deposited on the FeTi in the same manner as in Example 1—1, thereby preparing a hydrogen storing member for storing deuterium. Then, the thus prepared hydrogen storing member was electrolyzed in the same process as in Example 1—1. The same result as in Example 1—1 was obtained.

EXAMPLE 1-3

On a Ti rod as a first hydrogen storing material corresponding to the member 1 in FIG. 1 was formed $LaNi_5$ as a second hydrogen storing material corresponding to the member 2 by plasma melt injection, and Ti was further vapor deposited on the $LaNi_5$ in the same manner as in Example 1—1, thereby preparing a hydrogen storing member. Then, the thus obtained hydrogen storing member was electrolyzed in the same processes in Example 1. The same result as in Example 1—1 was obtained.

In the foregoing examples, the shape of the hydrogen storing member for storing deuterium was a cylindrical (rod) form, but any appropriate shape such as a spherical form, a thin film form, etc. can be used. Particularly in case of spherical shape, a uniform pressure can be applied to the spherical hydrogen storing member during the storage of deuterium, and thus a better effect can be obtained.

EXAMPLE 2

Storage of deuterium into the hydrogen storing member can be also carried out in the following manner besides the electrolysis process. That is, the process used in this example is to store deuterium by bringing a vessel containing the hydrogen storing member into a deuterium gas atmosphere compressed to a pressure of a few to a few tens of atmospheres and utilizing a solid solution equilibrium state of a metal hydride composed of two elements, i.e. a metal and deuterium, under a high pressure.

EXAMPLE 2-1

Figure 5:
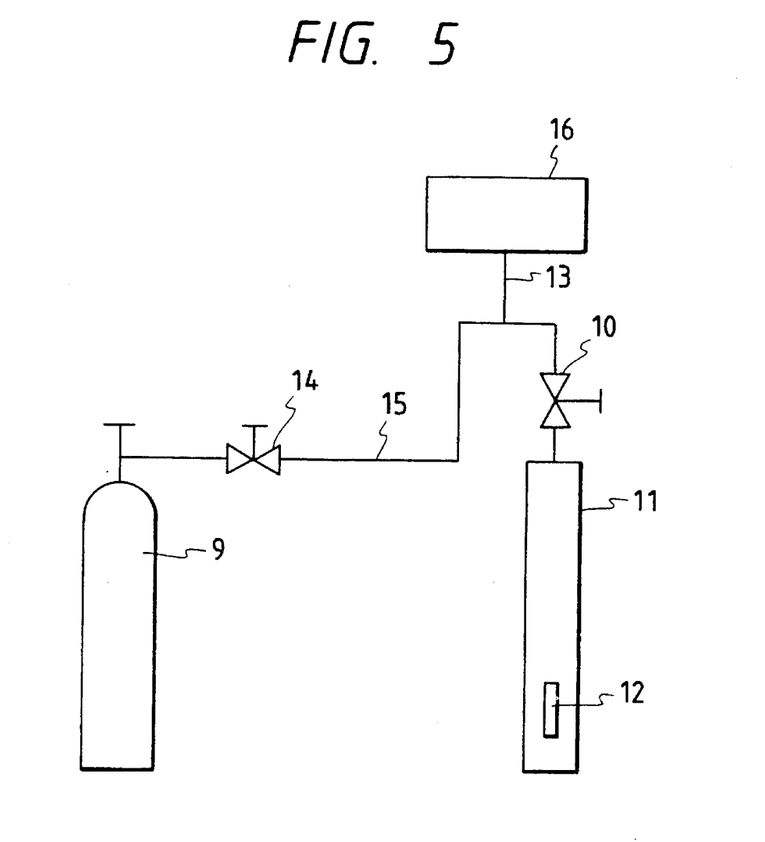
FIG. 5 is a schematic view showing an apparatus for storing hydrogen under pressure in a gas atmosphere applicable to the present invention.

A hydrogen storing member 12 having the same structure and dimension as that used in Example 1—1 was used in an apparatus shown in FIG. 5, where numeral 9 is a deuterium gas bomb, 11 is a high pressure pipe of stainless steel, etc. (e.g. 10 mm in outer diameter, 6 mm in inner diameter and 400 mm long), 10 and 14 are valves provided in a piping connecting the gas bomb 9 to the high pressure pipe 11, and 13 is a vent line connected to the piping between the valves 10 and 14 on one hand and also connected to a vacuum pump 16 on the other hand.

At first, the hydrogen storing member 12 was placed in the high pressure pipe 11, and the inside of high pressure pipe 11 was brought into a vacuum state by evacuation through the vent line 13, while keeping only the valve 10 in an open state. This was to remove light hydrogen to facilitate storing of only deuterium into the hydrogen storing member 12.

Then, the vent line 13 was closed and the valve 14 was brought into an open state to lead deuterium from the bomb 9 into the high pressure pipe 11. The valve 10 was closed when the pressure reached about 10 atm (23° C.) in the high pressure pipe 11. The high pressure pipe 11 was subjected repeatedly to cycles each of cooling the high pressure pipe 11 to 5° C. and elevating the pipe 11 to 50° C. in that state for one cycle time of about 5 minutes. That is, in this embodiment, cycles of both temperature and pressure were applied.

Approximately on the 7th day γ-rays were measured. About 2-fold emission of γ-rays was detected against the background.

COMPARATIVE EXAMPLE 2-1

The same process as that of Example 2-1 was carried out for simple Pd. Only emission of γ-rays on the same level as that of the background was detected.

EXAMPLE 3

The foregoing Examples 1 and 2 relate to storing of deuterium. The present invention is also very effective as a light hydrogen storing member. Its embodiment will be given below.

EXAMPLE 3-1

Electrolysis was carried out in the same manner as in Example 1—1 for about 3 days, using the same hydrogen storing member as in Example 1—1. Then, the hydrogen storing metallic member was broken to take out only Pd from the inside. The hydrogen content of the thus obtained Pd was measured by thermogravimetric analysis. It was found that the hydrogen was stored at such a high concentration as Pd:H=1:0.8.

COMPARATIVE EXAMPLE 3-1

When simple Pd was used in the same process as in Example 3-1, the hydrogen was stored at such a concentration as Pd:H=1:0.4

EXAMPLE 4

The hydrogen storing members used in the foregoing Examples were in a block form having some sizes such as a rod, etc. A hydrogen storing member, when constituted by providing a second hydrogen storing material between first hydrogen storing materials, may be not in such a block form, for example, may be in a powdery or fine particulate state.

Figure 6:
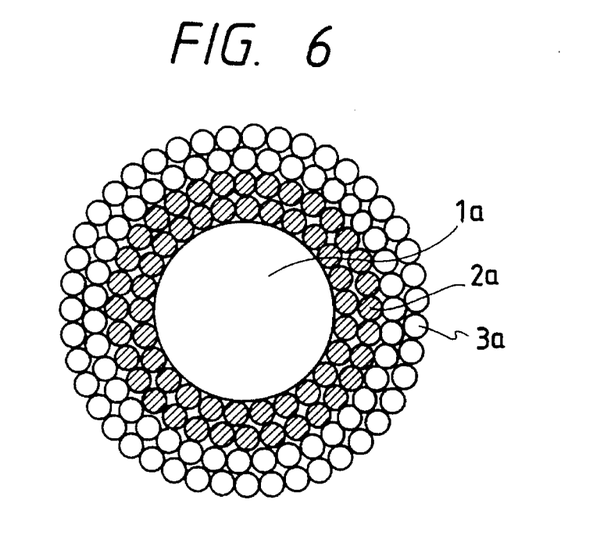
FIG. 6 is a schematic cross-sectional view of another structure of a hydrogen storing member according to the present invention.

FIG. 6 shows a structure of a hydrogen storing member constituted by such powdery (particulate) hydrogen storing materials, where numeral 1a is Pd powder as a first hydrogen storing material serving as a matrix, 2a is LaNi$_5$ powder as a second hydrogen storing material, formed thereon, and 3a is Pd powder as the first hydrogen storing material, further formed thereon.

EXAMPLE 4-1

Powdery hydrogen storing member shown in FIG. 6 was prepared in the following manner.

Powdery Pd (average particle size: about 10 μm) was dipped in a dispersion of LaNi$_5$ hydrogen storing alloy powder in polytetrafluoroethylene (PTFE) and then taken out. Then, the taken out powder was coated with a solution of organic polymer binder such as polyethylene, polytetrafluoroethylene, etc., and heat treated in an inert gas atmosphere to scatter the solvent, thereby obtaining the powder constituted by the members 1a and 2a. Then, the powder was dipped in an organic palladium solution (i.e. CCP-4230, trademark of a product made by Okuno Seiyaku K.K., Japan), taken out, heated at 250° C. for 10 minutes to scatter the binder of organic palladium, and then heat-treated in a reducing atmosphere at 300° C.

The thus prepared powdery hydrogen storing member was subjected to temperature cycles in a hydrogen atmosphere under 1 atm for about one hour in the same manner as in Example 1—1, and then the composition was analyzed. It was found that hydrogen was stored at a higher concentration such as Pd:H=1:0.9 (atomic ratio).

COMPARATIVE EXAMPLE 4-1

Powder of only Pd was subjected to hydrogen storage in the same manner as in Example 4-1. It was found that the concentration was Pd:H=1:0.5 (atomic ratio).

In the foregoing examples, temperature cycles or temperature-pressure cycles were applied to the hydrogen storing members, but the hydrogen storage can be also carried out only by pressure cycles.

As explained above, hydrogen can be stored into a hydrogen storing member efficiently at a high concentration in the present invention by constituting the hydrogen storing member from a first hydrogen storing material and a second hydrogen storing material capable of shifting phases (α←→β) while keeping the first hydrogen storing material in a stable region for the single β phase having a high capacity for storing hydrogen and by conducting storing or release of hydrogen into or from the second hydrogen storing material in a hydrogen atmosphere, thereby pumping much more hydrogen into the first hydrogen storing material. When the present invention is applied to deuterium, a probability of nuclear fusion can be enhanced.

We claim:

1. A process for preparing a hydrogen storing member containing hydrogen, which comprises:

(a) charging aqueous solution containing hydrogen or its isotope into a temperature-controllable thermostat tank and disposing a hydrogen storing member connected to a cathode and anode in the aqueous solution, wherein the hydrogen storing member comprises, a thick first hydrogen storing material member generating β phase which is capable of storing hydrogen at a first temperature range and generating β phase which is capable of storing hydrogen at a second temperature range set at a lower temperature than the first temperature range, a thin film of a second hydrogen storing material provided on the thick first hydrogen storing material member generating α phase which is capable of releasing hydrogen at the first temperature range and generating β phase which is capable of storing hydrogen at the second temperature range set at a lower temperature than the first temperature range, and a thin film of said first hydrogen storing material provided on the thin film of the second hydrogen storing material generating β phase which is capable of storing hydrogen at the first temperature range and generating β phase which is capable of storing hydrogen at the second temperature range set at a lower temperature than the first temperatures range;

(b) setting the thermostat tank at a temperature within the second temperature range and applying voltage to the cathode and the anode to carry out a first electrolysis; and (c) setting the thermostat tank at a temperature within the first temperature range and applying voltage to the cathode and the anode to carry out a second electrolysis.

2. The process of claim 1 wherein said isotope is selected from the group consisting of deuterium, tritium and mixtures thereof.

3. The process according to claim 1, wherein the first and the second electrolysis steps are repeated in sequence.

* * * * *

UNITED STATES PATENT AND TRADEMARK OFFICE
CERTIFICATE OF CORRECTION

PATENT NO. : 5,567,303

DATED : October 22, 1996

INVENTOR(S): KEISUKE YAMAMOTO, ET AL.

It is certified that error appears in the above-identified patent and that said Letters Patent is hereby corrected as shown below:

COLUMN 1

Line 41, "tions" should read --tion--;
Line 50, "utilize" should read --to utilize--.

COLUMN 2

Line 11, "pointed," should read --pointed out.--;
Line 33, "attentions" should read --attention--.

COLUMN 3

Line 22, "phenomena" should read --phenomenon--;
Line 34, "forcely" should read --forcibly--;
Line 40, "referring" should read --referring to--.

COLUMN 6

Line 6, "collide" should read --collide with--;
Line 10, "scintilator" should read --scintillator--;
Line 11, "scintilation" should read --scintillation--;
Line 29, "Pd3" should read --$Pd_3$--.

UNITED STATES PATENT AND TRADEMARK OFFICE
CERTIFICATE OF CORRECTION

PATENT NO. : 5,567,303

DATED : October 22, 1996

INVENTOR(S) : KEISUKE YAMAMOTO, ET AL.

Page 2 of 2

It is certified that error appears in the above-identified patent and that said Letters Patent is hereby corrected as shown below:

COLUMN 8

Line 65, "comprises," should read --comprises--.

COLUMN 9

Line 16, "tures" should read --ture--.

Signed and Sealed this

Third Day of June, 1997

Attest:

BRUCE LEHMAN

*Attesting Officer*   *Commissioner of Patents and Trademarks*